Nov. 19, 1940.  E. C. SLOAN  2,222,003

MEANS FOR PRODUCING ARTICLES OF FIBROUS COMPOSITION

Filed March 28, 1936  8 Sheets-Sheet 2

Inventor:
Edward C. Sloan
By Parkinson & Lane, Atty.

Nov. 19, 1940.   E. C. SLOAN   2,222,003
MEANS FOR PRODUCING ARTICLES OF FIBROUS COMPOSITION
Filed March 28, 1936   8 Sheets-Sheet 4

Patented Nov. 19, 1940

2,222,003

UNITED STATES PATENT OFFICE 2,222,003

MEANS FOR PRODUCING ARTICLES OF FIBROUS COMPOSITION

Edward C. Sloan, Geneva, Ill., assignor to Jesse B. Hawley, Geneva, Ill.

Application March 28, 1936, Serial No. 71,524

4 Claims. (Cl. 92—60)

The present invention relates to the art of making or producing articles preferably of accreted, interlaced and integrated fibrous material and particularly a novel method of drying or finishing the article and a novel means for effecting the same. The invention is especially adapted for use in finishing the hat disclosed in my co-pending application Serial No. 4,862, filed February 4, 1935.

The invention comprehends the provision of a novel drying or dry finishing die means comprising a rigid female die having a contoured face portion or wall conforming to the contoured face portion of the article to be dried or dry finished, and a yieldable male die so constructed and arranged to controllably distribute pressure on the article blank or carcass interposed between the male and female die, with suitable means to supply heat to the blank or carcass for driving off fluids, such as water, steam, vapors, gases, or the like, and also with novel means for affording ready and facile escape of such fluids.

A further object is to provide in such a means, novel means for readily and rapidly draining or conducting away the fluids mentioned, with or without additional or auxiliary draining features.

A further object of the invention is to provide novel means for applying a differential of pressure over different given or predetermined parts or portions of the blank or carcass as desired and needed for efficient drying or dry finishing of the article without danger of damaging any part of the carcass, such as scorching or the like, as also applying the pressure progressively in assistance of a rapid escape of the fluids driven off by the heat of the die means.

Other objects, advantages, capabilities, features, process steps, or the like are comprehended by the invention as will later appear and as are inherently possessed by the invention.

Referring to the drawings:

Fig. 13 is a vertical sectional view similar to Fig. 1 but showing the accreting, interlacing and integrating of another form of article, such as a vase, pot, or container or the like;

Fig. 14 is a similar view of a drying die means for the form of article mentioned above and shown in finished form in Fig. 16a;

Fig. 17 is a vertical sectional view of another alternate form of drying die means with means for increasing the efficacy and rate of the draining or escape of the fluids driven off by the heat of the drying die means;

Fig. 18 is a transverse sectional view taken in a plane represented by line 18—18 in Fig. 17 of the drawings; and, Fig. 19 is a view partly in plan and partly sectional of a lateral support member used in the lower part of the die means shown in Figs. 2, 3, 4, 5, 14, and 17.

Figure 1:
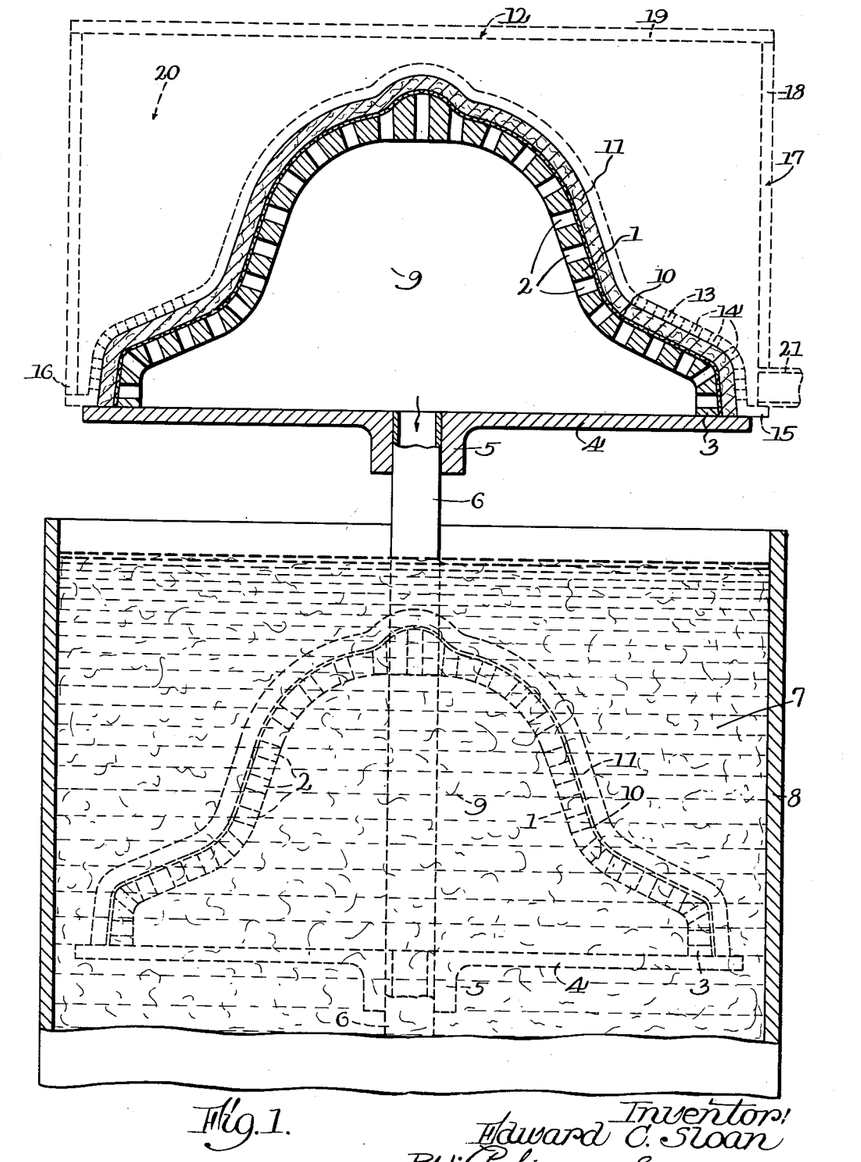
Fig. 1 is a view in vertical section of a means for accreting, interlacing and integrating fibrous material to produce an article blank or carcass, such as that for a hat or the like, the device being shown in different stages of operation.

Referring more in detail to the drawings a few embodiments are shown illustrative of the invention. In Fig. 1 is shown an illustrative means for accreting, interlacing and integrating an article, such as a hat, from fibrous material in suspension in a suspending fluid such as water. The material used is preferably pulp or the like, but it may include any other fibrous material such as wool, cotton, linen, silk, jute, hemp, asbestos, kapok, or any other kind of fibrous material, the term "pulp" being herein used generically to include any or any combination of the various fibres that may be used. The pulp may be prepared as disclosed in my above mentioned copending application Serial No. 4,862.

The means selected to illustrate the invention comprises a molding or forming die in the form of a contoured plate 1 provided with a plurality of openings or apertures 2 for the passage therethrough of the fluids of the bath holding the fibres in suspension, the lower rim 3 of this plate being seated upon a table or platen 4 having an apertured hub 5 in which is secured the upper end of a duct 6 leading to a suitable source of suction or pressure (not shown). The platen 4 is so constructed, arranged and adapted by suitable means (not shown) as to be lowered into and raised out of the bath 7 in a vat or tank 8. The plate 1 and the platen 4 enclose a chamber 9 in which is normally created a suction or sub-atmospheric pressure for the drawing of the water of the bath through the holes 2. The bath 7 consists of water, fibrous material and any of the substances above mentioned for treating the fibres, the fibres being maintained in dispersed suspension in the water by any suitable agitation of the bath by any desired means (not shown). The duct 6 is flexible so as to accommodate for the movement of the platen and the molding means.

The upper and outer surface of the plate 1 is shaped or contoured to conform with the shape or form of the article to be molded or accreted thereon. Upon this contoured surface is a reticulated sheet or screen 10 of fine mesh conforming in shape or contour to the surface contour of the plate 1.

In operation with the device in the position shown in full lines in Fig. 1, a suction or sub-atmospheric pressure is created in the chamber 9, and the platen 4 with the plate 1 and screen 10 are lowered and submerged in the bath 7, as shown by the dotted line position thereof in Fig. 1 of the drawings. The suction draws the water through the interstices of the screen 10 and the holes 2 of the plate 1 to be delivered to the duct 6, causing a deposit, accretion, interlacing and integration of the fibres in the form of a contoured layer or stratum 11 on the screen 10, the thickness and compactness or the density of this stratum depending upon the time of immersion, the magnitude of the suction, the nature of the fibres and the percentage of fibres in the bath. In some cases setting up a vibration in the molding or forming die or in the bath mass or both will also have some effect, particularly in the interlacing of the fibres, the vibration causing the fibres to be more effectively interlaced.

When the desired layer or stratum is accreted, interlaced and integrated, the platen 4, the molding die 1—10 and the fibrous stratum thereon are raised out of the bath 7. The suction during the emergence of the device and stratum is continued to prevent the washing away or sloughing off of the fibrous material, and also after emergence thereof, to draw air through the fibrous blank or stratum for removing surplus water, that is, as a preliminary step in the drying of the blank 11. If desired warm or heated air or the like may be thus drawn through the blank to dry the blank to some extent but it is preferable to dry the blank in a manner hereinafter more fully disclosed.

To assist in expelling the surplus water in the blank, a female die 12 shown in dotted lines in Fig. 1 may be applied to the blank with pressure to squeeze out some of the water as also to partly compress or compact the blank, the suction in the chamber 9 continuing to draw out this water and discharge it through the duct 6.

The female die 12 comprises a contoured wall or plate 13 conforming to the shape or contour of the blank and having holes or apertures 14 for the passage of air. At the base is provided a flange 15 upon which seats the lower edge portion 16 of the housing or casing 17 of the female die, this casing comprising side walls 18 and a top wall 19, thus enclosing a chamber 20 about the wall 13. The parts are suitably secured together by any suitable securing means (not shown). At a suitably low point is connected a pipe or duct 21 for the passage of fluid under pressure, either sub-atmospheric or super-atmospheric as required or desired, and also for the draining out of any water that might pass through the holes 14 when the wet blank 11 is being compressed between the die walls 1 and 13. At the time when the blank is being compressed and the suction in the chamber 9 is acting to draw the water from the blank, a fluid pressure may also be created in the chamber 20 so as to increase the pressure differential on the opposite sides of the blank and thus effect a greater expelling of the surplus water from the blank.

The die 12 also serves as a transfer means for the blank 11. After the blank 11 has been compressed as described above, the suction in chamber 9 is discontinued and, if desired, a pressure may be created therein, while at the same time a suction is created in the chamber 20 of the female die. This will cause the blank to cling or adhere to the contoured wall 13 of the female die so that as the die 12 is lifted or raised the blank 11 will be lifted or raised with it. The die 12 with the blank 11 clinging or adhering to it is then brought over a male die more fully disclosed hereinafter in connection with Figs. 2, 3, 4 and 5 of the drawings, and deposited thereon by changing the suction in the chamber 20 to a pressure so as to blow or force off the blank whereby it will be properly seated on the male die.

Figure 2:
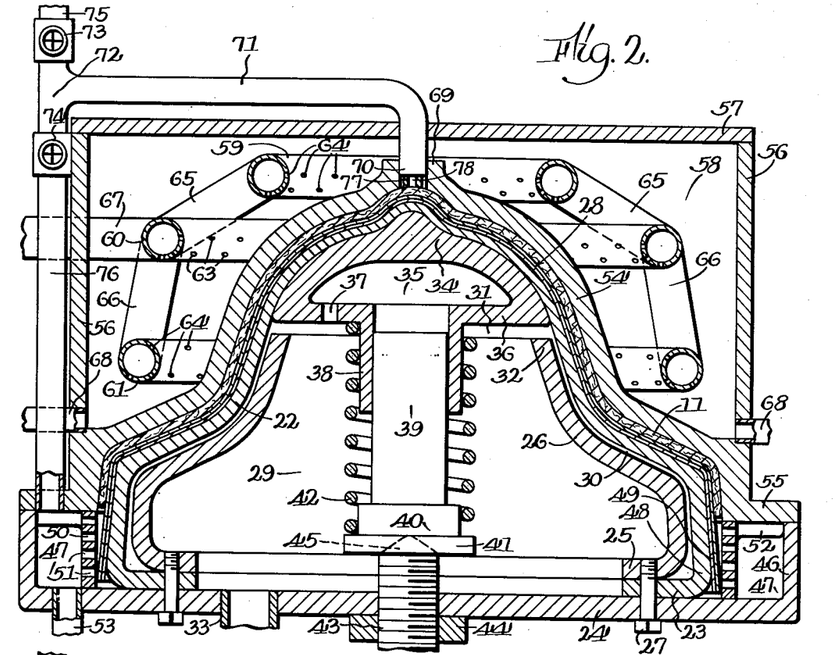
Fig. 2 is a vertical sectional view through an illustrative embodiment of drying die means comprehended by the invention.
Figures 3, 3A:
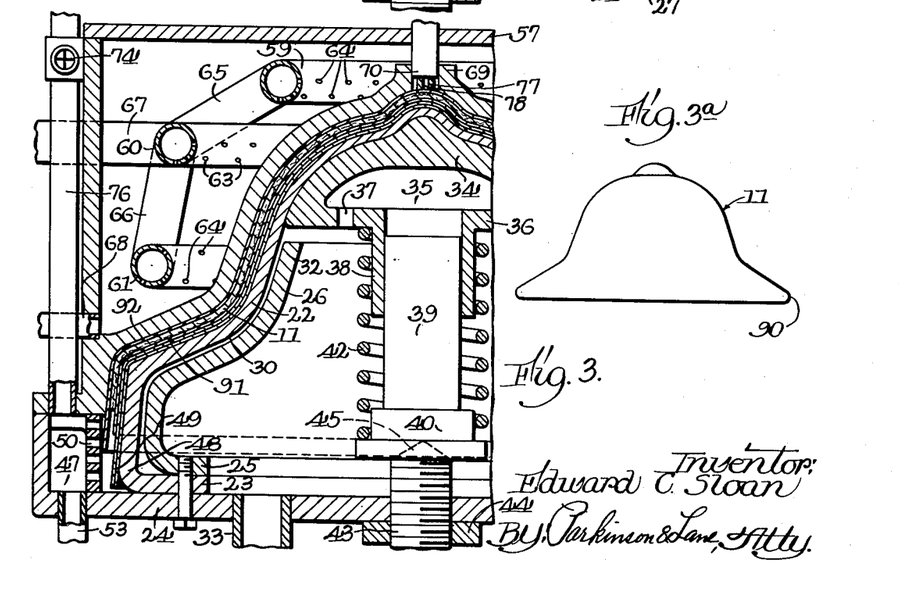
Fig. 3 is a similar view in another stage of operation.
Fig. 3a is an elevational view of a finished product such as a hat having a beaded edge produced as disclosed in Patent No. 2,093,167, issued September 14, 1937, to William C. Gray, entitled Forming die means.

One form of male die is shown in Figs. 2 and 3. It is of the yieldable type and comprises a hollow member or bag 22 composed of any suitable yieldable material, such as rubber, gutta percha or the like with or without embedded reinforcing means such as a yieldable fabric whether of metal mail, textile elements inwoven, knitted, netted, or like fabrication, etc. The member 22 is normally of the same contour as the blank 11 and at its base comprises a flange 23 clamped between a platen 24 and a flange 25 of a hollow rigid member 26 also contoured to conform to the general contour of the member 22, the clamping being effected by any suitable means as bolts 27. The thickness of the member 22 preferably decreases or tapers toward the upper portion thereof for a reason later disclosed. Upon the member 22 reposes a drain means or fluid escape means 28 generally and conventionally shown in Figs. 2 and 3 and more specifically shown in various forms in Figs. 6, 7, 8, 9, 10, 11 and 12 of the drawings and more fully described later.

Within the member 22 is provided a chamber 29, in which is included the rigid member 26, comprising a space 30 between the lower portion of the member 22 and the rigid member 26, as also a passage 31 over the upper end 32 of the member 26, this chamber being designed to contain a fluid, preferably a liquid, under pressure. The platen 24 is suitably apertured for the connection of a pipe or duct 33 for the conduction of the pressure fluid from a suitable source of pressure (not shown).

In the upper part of the chamber 29 is located a hollow rigid member 34 having a chamber 35 and a wall 36, this member 34 forming together with the member 26 relatively movable parts or components of the rigid die part of the yieldable male die mentioned, the relative movement between these parts being as desired within the limits of the space 31 between the wall 36 and the upper edge portion 32 of the member 26. The wall 36 is provided with a suitable opening 37 for the passage of the pressure fluid mentioned.

Rigid or integral with the wall 36 is a sleeve 38 having telescopic relation with a stem 39 having a head 40 provided with a flange 41 between which and the wall 36 reacts a helical spring 42 normally tending to hold the parts 34 and 26 apart. The stress of the spring 42 is adjusted or regulated by a screw 43 threaded in the platen 24 and held in adjusted position by a lock nut 44, the upper end of the screw being suitably designed, such as by having a pivot tip 45 in a pivot recess in the base of the head 40. The platen 24 at its margin has an encircling flange 46 to enclose a chamber 47 encircling the lower portion 48 of the yieldable die and also the lower portion 49 of the drain means.

To prevent the portions 48 and 49 from being distended or bulged into the chamber 47 when fluid pressure is applied to the inside of the bag 22, a lateral-support ring 50 is provided in the chamber 47 and adjacent to the portions 48 and 49 above mentioned. This ring encircles these portions 48 and 49 and is provided with apertures 51 for the passage of the fluids driven off by the heat of the die means, such as the water, steam, vapors, gases or the like into the chamber 47. The ring may have a few lugs 52 for holding the ring 50 in proper position in the chamber 47 as shown in Figs. 2 and 3. At one or more points, the chamber 47 is connected by way of one or more pipes or ducts 53 for the draining away of the fluids mentioned above, such as the water, steam, vapors, gases, or the like, driven off by the heat of the die means, and if desired such pipe or pipes may be connected to any suitable source of suction (not shown).

The rigid die member comprises a contoured wall 54 the inside surface of which is so outlined and designed as to give to the contoured surface of the hat blank or carcass 11 the desired configuration or decoration. The wall 54 has a base flange 55 so constructed and arranged as to form a closure for the chamber 47 when the rigid and yieldable die members are brought together by suitable press-operating mechanism (not shown).

Either rigid or integral with the wall 54 near its base are provided side walls 56 upon which is a cover plate or top wall 57, these walls enclosing the chamber 58 around the wall 54.

Within the chamber 58 is located a device for distributing a heating medium upon the outer surface of the contoured wall 54, this device comprising a plurality of annular ducts 59, 60 and 61 having apertures 62, 63 and 64 so disposed and located as to distributively project jets or sprays of the heat bearing medium, such as a vapor or a volatile liquid whereby the heating of the contoured wall 54 may be effected over the various portions thereof as desired. A condensible vapor is preferable because of the abundance of the heat of vaporization available when the vapor condenses. The duct 60 is connected to the ducts 59 and 61 by suitable ducts 65 and 66 for the conducting of the heat bearing fluid thereto, and a duct 67 leading to the heat bearing fluid source (not shown) is connected to the duct 60. At low points in the chamber 58 are connected outlet or drain ducts 68 for conducting away the heating fluid after giving up its heat to the wall 54. Any form of heat bearing fluid may be used whether it be in gaseous, vaporous, or liquid form.

At the top of the wall 54 is provided a hub or boss 69 with a recess in which is fixed an end 70 of a duct or pipe 71 connected to a fitting 72 having valves 73 and 74, the valve 73 being connected to a pipe or duct 75 and the valve 74 to a pipe or duct 76 having its lower end fixed in the flange 55 and leading to the chamber 47. In the bottom of the recess in the top part or hub 69 is provided a plug 77 having a plurality of holes or apertures 78 for the passage of water, steam, vapors, gases or the like, given off from the top part of the carcass 11 when subjected to heat. Depending upon which valve 73 or 74 is open the driven-off fluids may pass to the duct 75 to escape in the atmosphere or any other desired place, or by way of the duct 76 to the draining chamber 47 which, if desired, may be subjected to sub-atmospheric pressure for more effectively drawing away or draining the fluids mentioned.

Figure 6:
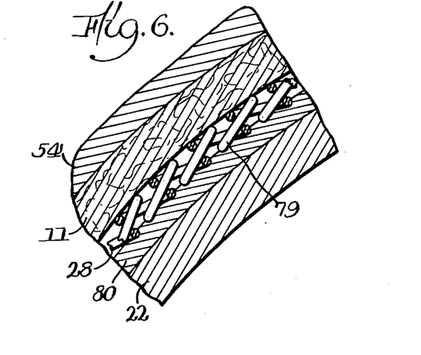
Fig. 6 is a fragmentary sectional view on an enlarged scale of the die means with an illustrative embodiment of a drain or escape means for the fluids driven off by the heat of the die means.
Figure 7:
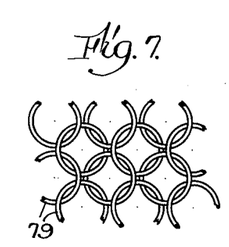
Figs. 7 and 8 are fragmentary plan views on an enlarged scale of an element of the yieldable die member and of means for the draining or escape of the fluids driven off by the heat of the die means.
Figure 8:
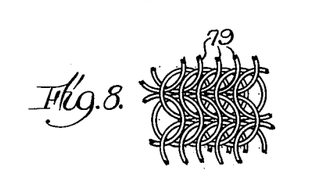

The drain means 28 between the carcass or blank 11 and the yieldable die is more particularly shown in various specific forms in Figs. 6, 7, 8, 9, 10, 11 and 12 of the drawings. In one form this means comprises an aggregate of rigid elements 79 which may be of any desired shape, such as circular as shown in Figs. 7 and 8. These elements are so interlinked as to provide innumerable intercommunicating spaces or voids among them to provide for a continuous, although tortuous, but free path or passage through the extent of the aggregate for the ready and rapid escape or draining of the fluids given off from the carcass under the effect of the heat supplied by or through the wall 54. The elements 79 are preferably so connected to the layer, sheet or coating 80 of yieldable or pliant material, such as soft rubber, woven, knitted or netted fabric, or the like, so that as the bag 22 stretches or contracts the layer 80 will also facilely and accordingly stretch or contract. When the layer 80 is of soft rubber it is preferably vulcanized to the bights of the rings 79 contacting the surface of the layer 80. Under these conditions when the layer 80 stretches the rings 79 will slip on each other so as to assume a more spaced relation such as is shown in Fig. 7, and when the layer 80 contracts the rings 79 will slip on each other so as to assume a more crowded condition such as is shown in Fig. 8. In other words, as a whole, the ring aggregate stretches and shrinks with the layer 80 and the bag 22, besides being also pliant in a transverse direction to easily and quickly conform to the contour of the inner surface of the carcass or blank 11 as pressure is applied by way of the bag 22. The layer 80 may merely repose on the bag 22 or may be engaged to it in any suitable manner as by vulcanizing or otherwise. The links 79, of course, may be of any form desired, as in the form of mail elements or the like.

If the layer 80 be of a fabric, such as woven fabric, it is preferable that the threads be on a bias and so woven, as loosely, as to permit a considerable latitude of stretching and contracting in any and all directions. Knitted and netted fabrics are usually easily strainable in all directions. When using a fabric the links 79 may be attached to it as desired as by thread loops or the like. On the side towards the carcass the aggregate of elements 79 contacts at innumerable points so that the total thrust is evenly distributed and divided with but very little pressure intensity at each point of contact so that the resultant effect is substantially a smooth contact against the inner surface of the carcass. The direction of pressure is at a normal to the surface of the carcass at each point of contact. By such a device the pressure is applied directly by mechanical means with the same advantage as if the pressure were applied by a liquid in accordance with the physical principle that a liquid transmits pressure at a normal to the surface pressed against at each point of contact.

Figures 9, 10, 11, 12:
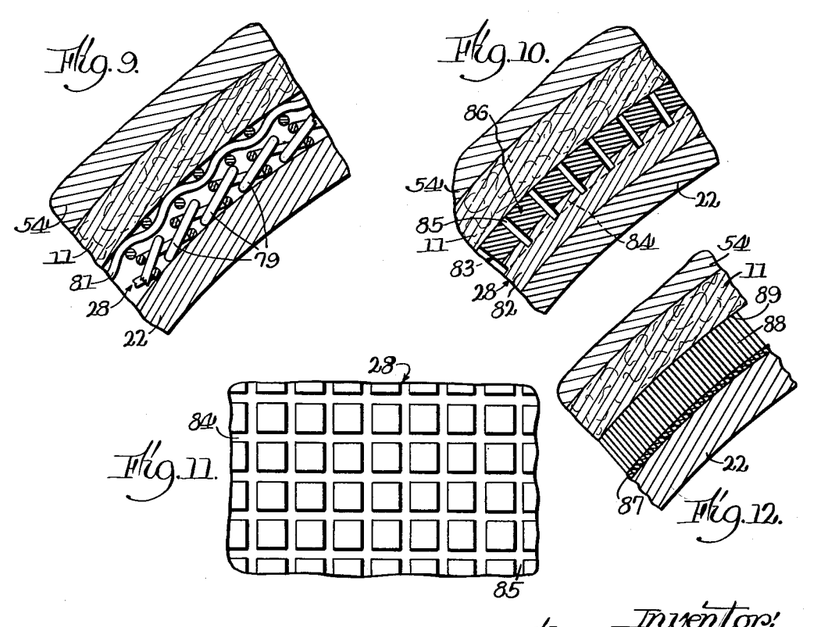
Fig. 9 is a fragmentary sectional view on an enlarged scale of another embodiment of the means for the draining or escape of the fluids driven off by the heat of the die means.
Figs. 10 and 11 are fragmentary sectional and plan views on an enlarged scale of a further alternate form of the means for the draining or escape of the fluids driven off by the heat of the die means.
Fig. 12 is a fragmentary sectional view on an enlarged scale of a further alternate form of the means for the draining or escape of the fluids driven off by the heat of the die means.

In Fig. 9 instead of using the layer 80 shown in Fig. 6, a facilely strainable fabric layer 81 of woven, knitted, netted, or the like texture is used preferably between the aggregate 28 of elements 79 and the inner surface of the carcass or blank 11, the fabric 81 having ample spaces or voids for the free passage of the fluids driven off from the carcass by the heat to the drain means 28. The bights of the links 79 contacting the fabric 81 may be connected thereto in any suitable manner as by thread loops, or the like, so that the aggregate 28 may stretch or contract with the fabric 81 as the bag 22 expands or contracts. The fabric 81 might, if desired, be on the side of the aggregate 28 next to the bag 22, that is, between the aggregate and the bag.

The form of drain means 28 shown in Figs. 10 and 11 preferably comprises a soft or yieldable back portion or back 82, such as soft rubber or the like, and a hard or rigid face portion 83, such as hard rubber or the like, provided with a plurality of channels 84 and 85 so as to provide a plurality of elements 86 each separated from the others by the channels mentioned. The channels extend into the soft portion 82 and below the hard parts 86 so that each element may flex at the region of the bases of the channels when the drain means is applied to the contoured surface of the carcass 11. The free ends of the elements 86 are preferably flat or substantially so and in the aggregate form a substantially continuous but expansible and contractible smooth surface for pressure contact against the inner contoured surface of the blank 11. When the bag 22 expands the portion 82 stretches and the elements 86 separate and when the bag 22 contracts the portion 82 also contracts or shrinks and the elements 86 become closer. The channels 84 and 85 receive the fluids given off from the carcass 11 by the heat, and afford a free way of escape of the fluids mentioned to the drain chamber 47 (Fig. 2), and, in some cases of operation, also by way of a duct 71 connected at the top of the die part 54. By using element 86 of this type a greater area of surface contact is effected yet having ample drainage passages for the escape of the fluids mentioned. The pliability of the portion 82 affords a facile pressing of the elements 86 over the whole extent of the contoured surface of the carcass, the pressure being directed at all points at a normal to such surface at each point of contact.

In Fig. 12 is shown another form of drain means 28 that may be used, and which comprises a backing 87 of yieldable material, such as rubber, woven, knitted or netted fabric, or the like, with an aggregate of stiff wire-like elements 88 an end of each of which is anchored in the backing 87 and the free ends or tips 89 of which are in a common surface coincident with the inner contoured surface of the carcass 11. Among the elements 88 are provided innumerable spaces or voids for the ready flow or escape of the fluids given off from the carcass by the heat. The elements 88 may be in the form of staples with the heads thereof in or at the backing 87. By reason of the pliability of the backing 87, the elements 88 may readily flex, that is, the free ends or tips 89 thereof may separate or approach each other as the aggregate of the elements press against the convexed or concaved contour of the surface of the carcass 11. The backing normally reposes on the bag 22 and as the latter expands or contracts the backing 87 likewise expands or contracts. The tips 89 being in a common surface present a comparatively smooth surface contact with the carcass, the total thrust being distributed and divided among the innumerable elements 88. Whether or not there is some penetration of the tips 89 into the carcass 11 I am not prepared to state, yet if there be any it would be beneficial because of providing between the tips and the fibres of the carcass avenues of escape from within the carcass body for the fluids given off by the heat from the wall 54. As in the other forms of the draining means this form (Fig. 12) also readily flexes and presses substantially evenly over the whole extent of the surface of the carcass, the pressure being directed at a normal to such surface at each point of contact.

In operation the chambers 29 and 35 are filled with a suitable fluid, preferably a hot fluid, such as hot water, or hot oil, or the like, which fluid is put under suitable pressure from any suitable pressure source (not shown) the pressure being transmitted by way of the pipe 33. To dry or dry finish a carcass, the fluid pressure in the yieldable die is reduced or released, and the rigid and yieldable dies are separated. The accreted carcass received from the accreting means shown in Fig. 1, is then placed on the yieldable die, that is, upon the draining means 28. The dies are then brought together by suitable press-operating means (not shown) so that the flange 55 will close or seal the chamber 47. Pressure is first effected by way of the upper rigid member 34 through the upper portion of the bag 22, the latter so yielding or otherwise as to conform to the contour of the upper portion of the blank 11 and as to press the upper portion of the draining means 28 to also conform to the contour of the upper portion of the blank 11. This effects a pressing of the upper portion of the carcass 11 against the upper portion of the hot wall 54 so as to start the driving off of the fluids such as the water, steam, vapors, gases, or the like, at that portion of the carcass, the lower portion of the draining means being still free and not loaded with like fluids. The fluids mentioned escape in the interspersed spaces or voids in the draining means 28 thence to the chamber 47 to be drained out by way of the pipe 53, a suction being used if desired to assist in this action. If either valve 73 or 74 be open some of the fluids will escape by way of the ducts 71 to either pipe 75 or 76.

At the same time, the pressure fluid in the chambers 29 and 35 is put under pressure so that the pressure fluid in the space between the bag 22 and the rigid wall 26 will expand that portion of the bag and cause the lower portion of the draining means to press the lower portion of the carcass against the lower portion of the hot wall 54, to then drive off the fluids, such as water, steam, vapors, gases, or the like from that portion of the carcass into the draining passages in the draining means and thence to the chamber 47. Then the pressure in the fluid in the yieldable die is reduced or released and the dies separate, so that the dried or dry finished carcass may be removed. This cycle of operation is effected in but a few seconds of time.

It will be noted that the upper portion of the bag 22 may be thinner than the lower portion thereof. That is of advantage when it is desired to apply heat from within the carcass, as from the hot pressure fluid, so as to assist the action of the heat from the upper portion of the wall 54 when the pressing action is initiated. As the fluids are acted upon by the heat from the wall 54, they will tend, if trapped, to act as heat insulation, and it might require more heat at a higher temperature to effectively drive off all of the fluids through the thickness of the carcass. By also supplying heat from within the carcass, less heat at a higher temperature mentioned above will be required, as sufficient heat to reach only half way through the carcass need be supplied from each side and the danger of scorching or otherwise damaging the blank will be avoided.

After the carcass is removed from the dies, it is then operated upon by suitable forming dies to produce a bead 90 at the edge of the article, such as a hat as shown in Fig. 3a, such as the die means disclosed in Patent No. 2,093,167, issued September 14, 1937, to William C. Gray.

In the form of device shown in Fig. 2, the carcass 11 has no coverings at the time it is operated upon, the coverings being later applied. Such coverings may be merely a stratum or strata of a fused and solidified permanent thermoplastic substance of a vinyl resin base type, preferably of the polymerization group, or may be sheets of textile fabric bound to the carcass by such a substance, or the like as desired. When binding the fabric to the carcass, the device of Fig. 2 may be used and, hence, in Fig. 3 is shown the same as applied to a carcass 11 having inner and outer coverings 91 and 92 of cloth being bound with the thermoplastic substance by the heat of the dies, the heat fusing the thermoplastic which acts as an extremely tenacious adhesive when it cools and solidifies. The structure of Fig. 3 is otherwise identical to that shown in Fig. 2.

Figure 4:
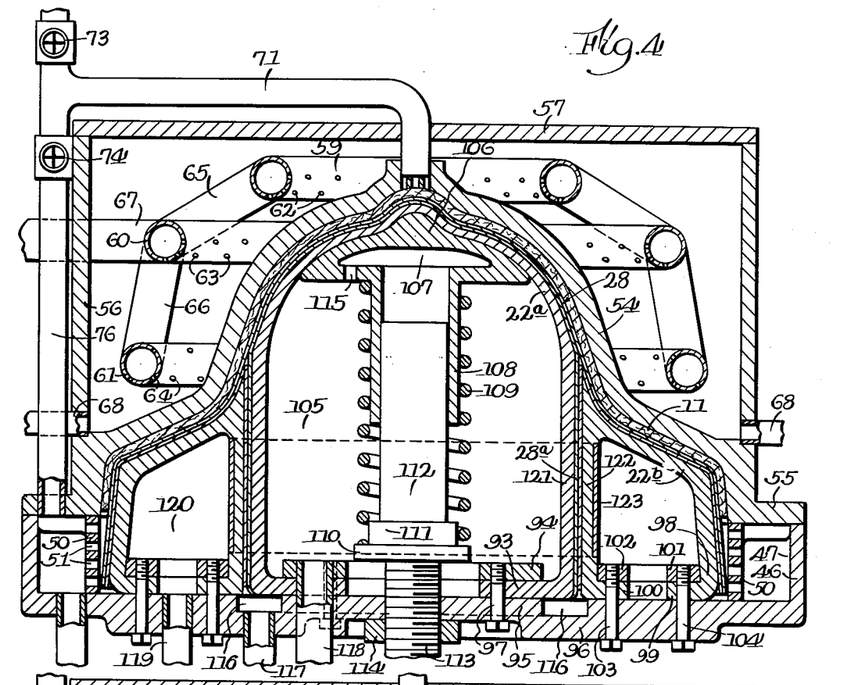
Fig. 4 is a vertical sectional view of an alternate form of die means having segmental or sectional portions for differential distribution of pressure and heat.

In some cases it may be desirable to apply different pressures over different areas of the article, as also different heat effects. In Fig. 4 is shown a device of this type. The female or rigid die part is identical to the corresponding female or rigid die part shown in Figs. 2 and 3 and, therefore, the same reference characters are used.

The yieldable die comprises a central or inner yieldable or pliant die part or bag 22ᵃ and an outer or encircling die part or bag 22ᵇ. These bags are of yieldable material, such as rubber, or the like. The bag 22ᵃ has a flange 93 clamped between a ring 94 and a portion 95 of a platen 96 by means of bolts 97. The platen 96 has (as in Figs. 2 and 3) an upstanding flange 46 with which seats and seals the flange 55 of the female die to close a chamber 47. In the chamber 47 is a lateral support ring 50 having apertures 51, for preventing the distortion of the wall 98 of the yieldable bag 22ᵇ when pressure is imposed thereon. The bag 22ᵇ has flanges 99 and 100 clamped between rings 101 and 102 and the platen 96 by bolts 103 and 104. Between the carcass 11 and the bags 22ᵃ and 22ᵇ is placed a draining means 28 and between the bags 22ᵃ and 22ᵇ is placed a draining means 28ᵃ. Within the chamber 105 formed by the bag 22ᵃ and associated parts is located a rigid die member 106 having a chamber 107 and a shank 108 extending in a helical spring 109 reacting between the member 106 and the flange 110 of a head 111 having a shaft 112 in telescopic relation with the shank 108. The head 111 is regulated by a screw 113 threaded in the platen 96 and having a pivotal engagement with the head 111, the screw 113 being set in adjusted or regulated position by a lock nut 114. The member 106 has a passage 115 for entry of pressure fluid to the chamber 107. The draining means 22ᵇ extends to a chamber 116 with which is connected a pipe or duct 117 which may be connected to a suitable source of suction (not shown). To supply fluid under pressure to the bags 22ᵃ and 22ᵇ, the ring 94 is connected by way of a duct or pipe 118 and the platen 96 is connected to a duct or pipe 119 respectively communicating with the chambers 105 and 120 of the bags 22ᵃ and 22ᵇ.

The drain means 28 and 28ᵃ may be of any of the specific forms shown in Figs. 6, 7, 8, 9, 10, 11 and 12.

It is preferable to apply different pressures to the bags 22ᵃ and 22ᵇ, as for example, a greater pressure may be effected in the fluid (such as hot oil or the like) in a chamber 105 to give the upper portion of the blank 11 a greater thrust, and a lesser pressure in the fluid (such as hot oil or the like) in chamber 120 to give the lower portion of the blank 11 a lesser thrust. When a given pressure exists in chamber 105, in order to prevent the outward bulging or distortion of the adjacent wall portions 121 and 122 of the bags 22ᵃ and 22ᵇ, a lateral supporting ring or band 123 of suitable material which will not stretch in length is disposed adjacent the outer face of the wall 122.

In some cases it may be desirable that the upper portion of the carcass be compressed and dried slightly in advance of the lower portion of the carcass, whereby the pressure in the chamber 105 will be effected prior to the pressure in the chamber 120. As indicated above, the pressure in chamber 120 may be less than in chamber 105, but in some cases the pressure in chamber 120 may be the same or brought up from a lower pressure to the same pressure as in chamber 105, depending upon the desired or needed results of drying in different portions of the article.

By having a drain means 28ᵃ between the bags 22ᵃ and 22ᵇ, an additional avenue of escape is presented intermediate the upper and lower portions of the carcass for the fluids driven off from the carcass by the heat. In other respects this device operates as does that shown in Figs. 2 and 3 of the drawings.

Figure 5:
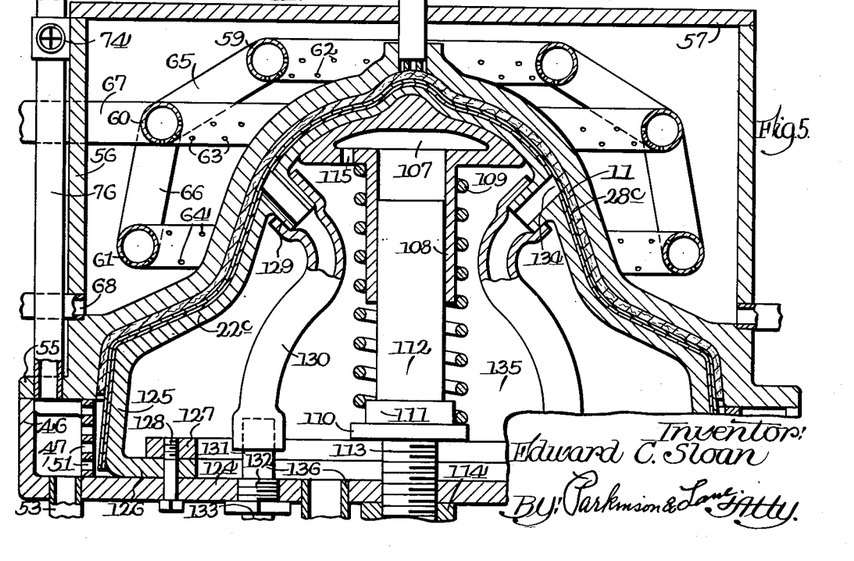
Fig. 5 is a similar view of another alternate form for increasing the efficacy and rate of drainage or escape of the fluids driven off by the heat of the die means.

In the form of device shown in Fig. 5 a yieldable die of the type shown in Figs. 2 and 3 is used but with additional means for conducting off the fluids given off by the heat, the conducting means being applied at any desired number of points and intermediate the upper and lower portions of the blank or carcass 11. The rigid or female die part is identical to those shown in Figs. 2, 3 and 4. The yieldable die part has a platen 124 having (as shown in Figs. 2, 3 and 4) an upstanding flange 46 with which seats and seals the flange 55 of the female die to close the chamber 47. In the chamber 47 is a lateral support ring 50 having apertures 51, for preventing the distortion of the wall 125 of the yieldable die part or bag 22c when pressure is imposed thereon. The bag 22c has a flange 126 clamped between a ring 127 and the platen 124 by bolts 128.

At an intermediate portion of the bag 22c may be provided any desired number of nipples 129 to each of which is connected an end of a flexible duct 130, the other end of the duct being connected to a nipple 131 extending through and fixed to the platen 124 as by a suitable fitting 132, the latter being connected to a duct or pipe 133 leading to a suitable source of suction (not shown) if desired. The drain means 28c corresponding to the drain means 28 of Figs. 2 and 3, and being of any specific form as shown in Figs. 6, 7, 8, 9, 10, 11, and 12, has suitable openings 134 registering with the nipples 129. By such a structure fluids driven off by the heat are rapidly and readily conducted away, especially at the upper portion of the die. The ducts 130 are so reinforced as not to collapse under the pressure of the fluid in the chamber 135 in the bag 22c but may easily bend or flex under the expanding and contracting action of the bag 22c. To the platen 124 is connected a duct 136 for supplying fluid (such as hot oil) under pressure to the chamber 135. In other respects the structure is similar to that shown in Fig. 4 and is correspondingly identified by like reference characters. The operation of the device is similar to that described in connection with Figs. 2, 3 and 4.

Figure 13:
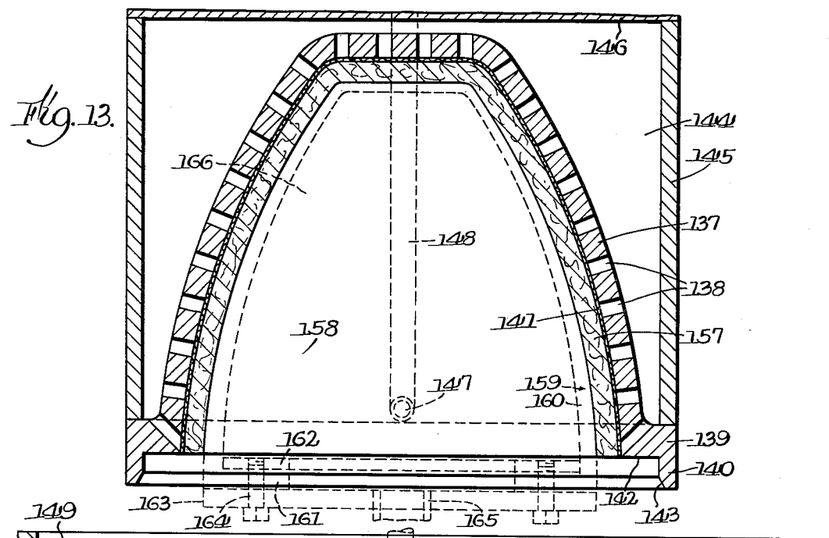

In Figs. 13 to 19 inclusive are shown means for making and drying or dry finishing an article of different form, Fig. 13 showing the means for accreting etc. such an article. Specifically, the article selected to illustrate the invention is in the form of a container, such as a bowl, drinking vessel, pot, or the like. The accreting etc. in this case is effected from below instead of from above and upon the molding die means.

Referring more in detail to the drawings, and particularly Fig. 13, a few embodiments are shown illustrative of the invention. In Fig. 13 is shown an illustrative means for accreting, interlacing and integrating an article, such as a pot, container or the like, from fibrous material in suspension in a suspending fluid such as water as described in connection with Figs. 1 to 12.

The accreting means comprises a contoured plate or wall 137 having a plurality of holes or apertures 138, and a base flange 139 having a depending rim 140. Within the wall 137 is located a contoured sheet 141 which may be reticulated or porous as desired, this sheet being held in adjacency with the wall 137 in any suitable manner. The lower end of the wall 137 has a shoulder 142, and the rim 140 has a chamfer 143. Over and around the wall 137 is a chamber 144 having side walls 145 and a top wall 146 suitably seated upon and sealed to the walls 145, the latter being suitably seated upon and sealed to the flange 139. At a low point the wall 145 has an outlet 147 communicating with a duct or pipe 148 for drawing out the fluid drawn through the molding die as the fibres are being accreted thereon, the duct 148 being connected to a suitable source of suction (not shown). The molding die means is shown in full lines in Fig. 13 when in elevated position or out of the bath 149 in the vat or tank 150, and in dotted lines when submerged in the bath 149 when the accreting action takes place. Also, the molding die means is carried by any suitable operating means (not shown) for lowering and raising the die means into and out of the vat 150 for submergence in and emergence from the bath 149.

In the vat 150 is a felting plate 151 having an opening 152 generally of the same shape but smaller than the opening in the lower part of the molding or forming plate or wall 137. The felting plate 151 is so supported as to be normally above the level of the bath but depressible when the forming die means is lowered and submerged in the bath. The plate 151, shown by way of illustration, has lugs 153 extending into springs 154 held upright in any suitable manner. When the molding or forming die means is lowered, the plate 151 contacts the chamfered or guiding surface 143 to direct the plate to the seat or shoulder 142 formed on the bottom of the molding wall 137. By reason of the opening 152 being smaller than the opening in the lower end of the molding wall 137, the plate 151 has a portion 155 inwardly overhanging the shoulder or seat 142 so that the plate 151 acts as a backing or support for the edge 156 of the accreted blank or carcass 157, otherwise the edge portion of the blank would taper or be of incorrect thickness. The plate portion 155 also prevents the sloughing off of the fibrous material of the edge portion 165 of the blank when the die is raised out of the bath and as the bath fluid in the chamber 158 of the molding die means flows out as the die means is raised out of the bath.

In operation, with the device in the position shown in full lines in Fig. 13, a suction or subatmospheric pressure is created in the chamber 144 and the device is lowered and submerged in the bath 149 as shown by the dotted line position thereof in Fig. 13 of the drawings. As the device is lowered and submerged in the bath 149, as shown by the dotted line position thereof in Fig. 13 of the drawings, the lower end of the molding wall 137 contacts the plate 151, the chamfered face 143 guiding the edge portion of the plate 151 to its seat or shoulder 142 of the molding die, and then the platen is depressed while compressing the springs 154, to the full line position shown thereof in Fig. 13.

The suction in the chamber 144 draws the water through the holes 138 and the interstices or apertures of the screen or sheet 141 to be delivered to the duct 148, causing a deposit, accretion, interlacing and integration of the fibres in the form of a contoured layer or stratum 157 on the screen or sheet 141, the thickness and compactness or density of this stratum depending upon the time of immersion, the magnitude of the suction, the nature of the fibres, and the percentage of the fibres in the bath. In some cases setting up a vibration in the molding or forming die or in the bath mass or both will also have some effect, particularly in the interlacing of the fibres, the vibration causing the fibres to be more effectively interlaced.

When the desired layer or stratum is accreted, interlaced and integrated, the device with the stratum or blank 157 therein are raised out of the bath 149. The suction during the emergence of the device and stratum from the bath is continued to prevent the washing away or sloughing off of some of the fibrous material, and also, after emergence thereof, to draw air through the fibrous blank or stratum 157 for removing surplus water, that is, as a preliminary step in the drying of the blank 157.

If desired warm or heated air or the like may be thus drawn through the blank to dry the blank to some extent but it is preferable to dry the blank in a manner herein otherwise more fully disclosed.

To assist in expelling the surplus water in the blank, a male die 159, shown in dotted lines in Fig. 13, may be applied to the blank with pressure to squeeze out some of the water as also to partly compress or compact the blank, the suction in the chamber 144 continuing to draw out this water and discharge it through the duct 148.

The male die 159 may comprise a contoured wall 160 preferably of yieldable material such as rubber, or the like conforming to the shape or contour of the inside of the blank 157, the wall 160 at its lower end having a flange 161 clamped between a ring 162 and a platen 163 by means of suitable securing elements such as bolts 164. The platen has an opening for connection of a duct or pipe 165 for supplying fluid under pressure in the chamber 166 of the die member or bag 160. As the pressure fluid in the chamber 166 is stressed at any given or desired pressure it causes the bag 160 to expand and compress the blank 157 evenly at all points, the direction of pressure being at a normal to the surface of contact of the blank 157 at each point of contact.

After compressing the blank as above described the male die may be removed, and the molding die may serve, if desired, as a transfer means for the blank 157. This may be effected by bringing a male die such as is shown in Figs. 14, 15, 16, or 17 into place within the blank 157, and the suction in the chamber 144 changed to a pressure so as to force off the blank 157 from the molding die and cause it to be deposited on the male die mentioned. Or, if desired, the blank 157 may be merely blown off from the molding die without the use of the male die mentioned, and the blank or carcass 157 may then be placed on the male die of Fig. 14, etc., in any suitable manner.

Figure 14:
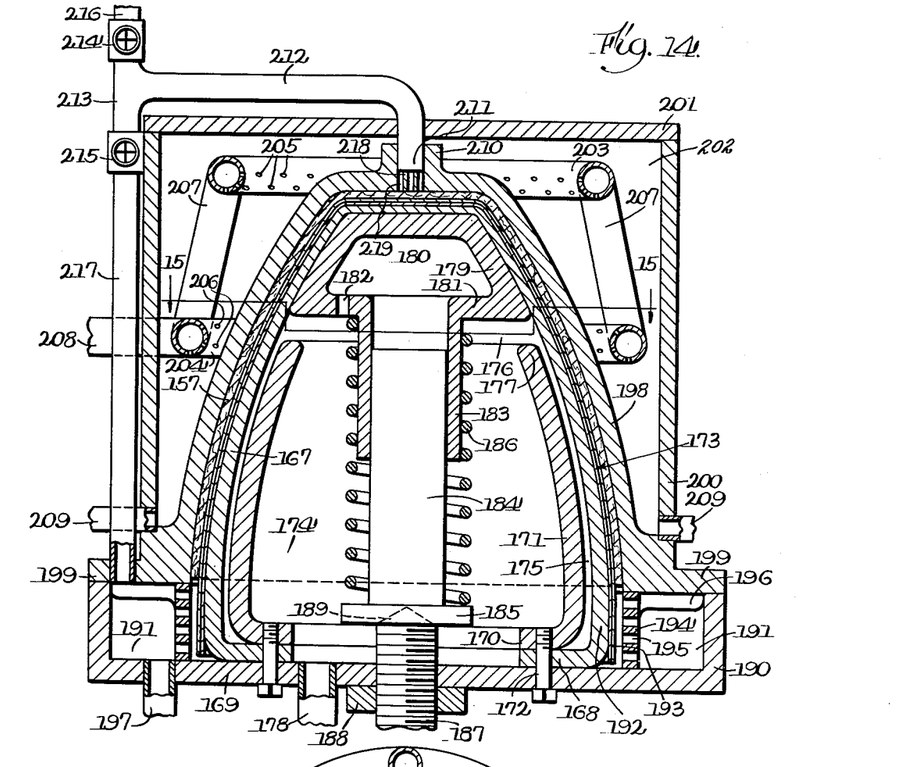
Figure 15:
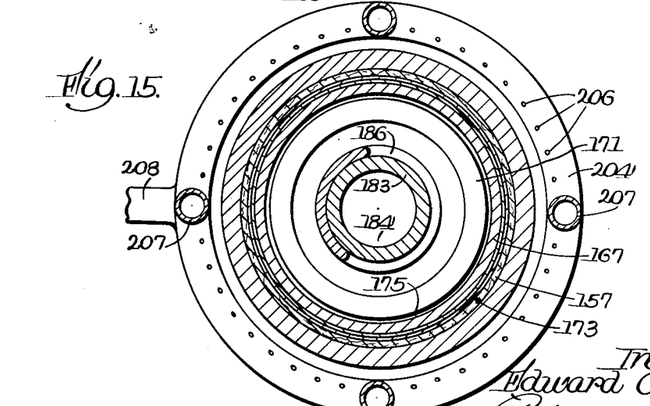
Fig. 15 is a horizontal sectional view taken in a plane represented by line 15—15 in Fig. 14 of the drawings.

One form of male die is shown in Figs. 14 and 15. It is of the yieldable type and comprises a hollow member or bag 167 composed of any suitable yieldable material, such as rubber, gutta percha, or the like with or without imbedded reinforcing means such as a yieldable fabric whether metal mail, textile elements in woven, knitted, netted, or like fabrication, etc. The member 167 is normally of the same contour as the blank 157 and at its base comprises a flange 168 clamped between a platen 169 and a flange 170 of a hollow rigid member 171 also contoured to conform to the general contour of the member 167, the clamping being effected by any suitable means as bolts 172. The thickness of the member 167 preferably decreases or tapers toward the upper portion thereof for a reason later disclosed. Upon the member 167 reposes a drain means or fluid escape means 173 similar to drain means 28 and generally and conventionally shown in Figs. 14 and 15 and more specifically shown (as drain means 28) in various forms in Figs. 6, 7, 8, 9, 10, 11 and 12 of the drawings and herein otherwise more fully described.

Within the member 167 is provided a chamber 174 in which is included the rigid member 171, comprising a space 175 between the lower portion of the member 167 and the rigid member 171, as also a passage 176 over the upper end 177 of the member 171, this chamber being designed to contain a fluid, preferably a liquid, under pressure. The platen 169 is suitably apertured for the connection of a pipe or duct 178 for the conduction of the pressure fluid from a suitable source of pressure (not shown).

In the upper part of the chamber 174 is located a hollow rigid member 179 having a chamber 180 and a wall 181 having an aperture 182, this member 179 forming together with the rigid member 171 relatively movable parts or components of the rigid die part of the yieldable male die mentioned, the relative movement between these parts being as desired within the limits of the space 176 between the wall 181 and the upper edge portion 177 of the member 171. The aperture 182 provides for passage of the pressure fluid in the chamber 180 of the member 179.

Rigid or integral with the wall 181 is a sleeve 183 having telescopic relation with a stem or shaft 184 having a head 185 between which and the wall 181 reacts a helical spring 186 normally tending to hold the parts 179 and 171 apart. The stress of the spring 186 is adjusted or regulated by a screw 187 threaded in the platen 169 and held in adjusted position by a lock nut 188, the upper end of the screw being suitably designed, such as by having a pivot tip 189 in a pivot recess in the head 185. The platen 169 at its margin has an encircling flange 190 to enclose a chamber 191 encircling the lower portion 192 of the yieldable die as also the lower portion 193 of the drain means.

To prevent the portions 192 and 193 from being distended or distorted into the chamber 191 when fluid pressure is applied in the inside of the bag 167; a lateral supporting ring 194 is provided in the chamber 191 and adjacent to the portions 192 and 193 above mentioned. This ring encircles these portions 192 and 193 and is provided with apertures 195 for the passage of the fluids driven off by the heat of the die means, such as the water, steam, vapors, gases, or the like into the chamber 191. The ring may have a few lugs 196 for holding the ring 194 in proper position in the chamber 191, as shown in Fig. 14. At one or more points, the chamber 191 is connected by way of one or more pipes or ducts 197 for the draining away of the fluids mentioned above, such as the water, steam, vapors, gases, or the like, driven off by the heat of the die means, and if desired such pipe or pipes 197 may be connected to any suitable source of suction (not shown).

The rigid die member comprises a contoured wall 198 the inside surface of which is so outlined and designed as to give to the outer surface of the blank or carcass 157 the desired configuration and decoration. The wall 198 has a base flange 199 so constructed and arranged as to form a closure for the chamber 191 when the rigid and yieldable die members are brought together by suitable press-operating mechanism (not shown). Either rigid or integral with the wall 198 near its base are provided side walls 200 upon which is a cover plate or top wall 201, these walls enclosing a chamber 202.

Within the chamber 202 is located a device for distributing a heating medium upon the outer surface of the contoured wall 198, this device comprising a plurality of annular ducts 203 and 204 having apertures 205 and 206 so disposed and located as to distributively project jets or sprays of the heat bearing medium, such as a vapor of a volatile liquid whereby the heating of the contoured wall 198 may be effected over the various portions of the wall 198 as desired. A condensible vapor is preferable because of the abundance of the heat of vaporization when it condenses. The ducts 203 and 204 are connected together by ducts 207 for the conducting of the heat bearing fluid from one to the other, and to the duct 204 is a supply duct 208 leading to the heat bearing fluid supply (not shown). At low points in the chamber 202 are connected outlet or drain ducts 209 for conducting away the heating fluid after giving up its heat to the wall 198. Any form of heat bearing fluid may be used whether it be in gaseous, vaporous, or liquid form.

At the top of the wall 198 is provided a hub 210 having a recess in which is fixed an end 211 of a duct or pipe 212 connected to a fitting 213 having valves 214 and 215, the valve 213 being connected to a duct or pipe 216 and the valve 215 being connected to a pipe or duct 217 having its lower end fixed in the flange 199 and leading to the chamber 191. In the bottom of the recess in the hub 210 is provided a plug 218 having a plurality of holes or apertures 219 for the passage of the fluids driven off by the heat of the dies, such as water, steam, vapors, gases, or the like, especially those given off from the upper portion of the carcass or blank 157. Depending upon which valve 214 or 215 is open the driven-off fluids may pass to the duct 216 to escape to the atmosphere or any other desired place or by way of the duct 217 to the draining chamber 191 which, if desired, may be subjected to sub-atmospheric pressure for more effectively drawing away or draining the fluids mentioned.

The drain means 173, corresponding to the means 28 in Figs. 2 and 3, between the carcass 157 and the yieldable die is more particularly shown in various specific forms in Figs. 6, 7, 8, 9, 10, 11 and 12 of the drawings and repetition of their specific description is not necessary here, reference being simply made thereto for the purpose of this part of the disclosure.

In operation the chambers 174 and 180 are filled with a suitable fluid, preferably a hot fluid, such as hot water, or hot oil, or the like, which fluid is put under suitable pressure from any suitable pressure source (not shown) the pressure being transmitted by way of the pipe or duct 178. To dry or dry finish a carcass or blank, the fluid pressure in the yieldable die is reduced or released, and the rigid and yieldable dies are separated. The accreted carcass received from the accreting means, shown in Fig. 13, is then placed on the yieldable die, that is upon the draining means 173. The dies are then brought together by suitable press-operating means (not shown) so that the flange 199 will close and seal the chamber 191. Pressure is first effected by way of the upper rigid member 179 through the upper portion of the bag 167, the latter so yielding or otherwise as to conform to the contour of the upper portion of the blank 157 and as to press the upper portion of the draining means 173 to also conform to the contour of the upper portion of the blank 157. This effects a pressing of the upper portion of the blank or carcass 157 against the upper portion of the hot wall 198 so as to start the driving off of the fluids, such as the water, steam, vapors, gases, or the like, at that portion of the carcass, the lower portion of the draining means being still free and not loaded with like fluids. The fluids mentioned escape in the interspersed spaces or voids in the draining means thence to the chamber 191 to be drained out by way of the pipe 197, a suction being used if desired, to assist in their action. If either valve 214 or 215 be open some of the fluids will escape by way of the duct 212 to either pipe 216 or 217.

At the same time, the pressure fluid in the chambers 174 and 180 is put under pressure so that the pressure fluid in the space between the bag 167 and the rigid wall 171 will expand that portion of the bag and cause the lower portion of the draining means to press the lower portion of the carcass against the lower portion of the hot wall 198, to then drive off the fluids, such as water, steam, vapors, gases, or the like, from that portion of the carcass into the draining passages in the draining means and thence to the chamber 191. Then the pressure in the fluid in the yieldable die is reduced or released and the dies separated, so that the dried or dry finished carcass may be removed. This cycle of operation is effected in but a few seconds of time.

It will be noted that the upper portion of the bag 167 may be thinner than the lower portion thereof. That is of advantage when it is desired to apply heat from within the carcass, or from the hot pressure fluid, so as to assist the action of the heat from the upper portion of the wall 198 when the pressing action is initiated. As the fluids are acted upon by the heat from the wall 198, they will tend, if trapped, to act as heat insulation, and it might require more heat at a higher temperature to effectively drive off all of the fluids through the thickness of the carcass. By also supplying heat from within the carcass, less heat at a higher temperature mentioned above will be required as sufficient heat to reach only half way through the carcass need be supplied from each side, and the danger of scorching or otherwise damaging the blank will be avoided.

After the carcass is removed from the dies, it then may be trimmed and the edge at the opening of the article beaded if desired. If it is beaded, it may be operated upon by suitable die means (not shown) similar to that disclosed in Patent No. 2,093,167, issued September 14, 1937, to William C. Gray.

In the form of device shown in Fig. 14 the carcass has no coverings at the time it is operated upon, the coverings being later applied if coverings are to form parts of the finished product. Such coverings may be a stratum or strata of a fused and solidified permanent thermoplastic substance of a vinyl resin base type, preferably of a polymerization group, or may be sheets of textile fabric bound to the carcass by such a substance or the like as desired. When binding the fabric to the carcass, the device of Fig. 14 may be used, the heat effecting the fusing of the thermoplastic substance which on cooling solidifies and binds the fabric coverings firmly to the carcass, such substance acting as an extremely tenacious adhesive.

Figures 16, 16A:
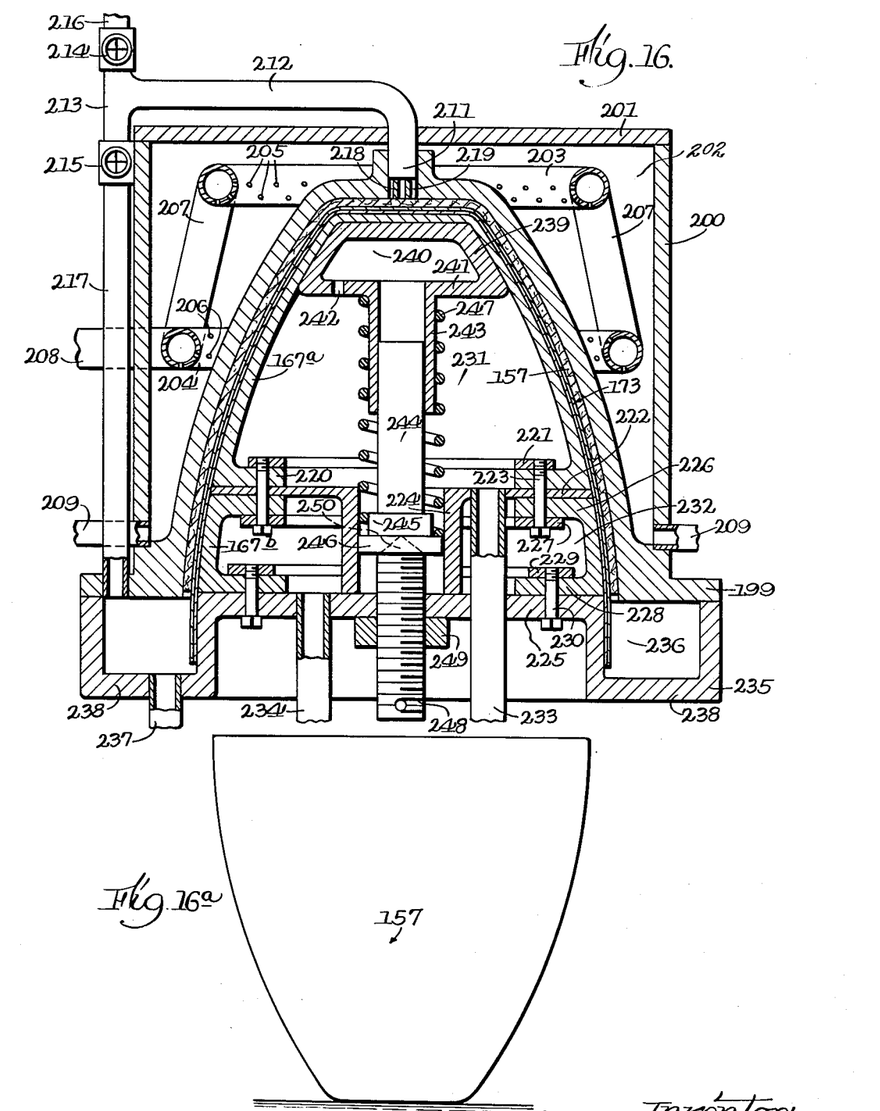
Fig. 16 is a vertical sectional view of an alternate embodiment of drying die means embodying the means for different distributions of pressure.
Fig. 16a is an elevational view of the article produced by the above means.

In some cases it may be desirable to apply different pressures over different areas of the article, as also different heat effects. In Fig. 16 is shown a device of this type. The female or rigid die part is identical to the corresponding female or rigid die part shown in Figs. 14 and 15, and, therefore, the same reference characters are used.

The yieldable die comprises an upper yieldable or pliant die part or bag 167ª and a lower yieldable or pliant die part or bag 167ᵇ. These bags are of yieldable material, such as rubber, gutta percha, or the like. The bag 167ª has a flange 220 clamped between a ring 221 and a plate 222 by means of bolts 223 or the like. The plate 222 has a hub 224 rigid or integral with a platen 225. The bag 167ᵇ has an upper flange 226 clamped between the plate 222 and a ring 227 by means of bolts 223, and a lower flange 228 clamped between the platen 225 and a ring 229 by means of bolts 230 or the like. The bags 167ª and 167ᵇ respectively enclose chambers 231 and 232 for containing a pressure fluid in each independently of the other so that different pressures may be effected in these chambers. The chamber 231 communicates with a source of pressure (not shown) by way of a pipe or duct 233 fixed in a suitable opening provided in the plate 222 and passing through a suitable opening in the platen 225, and the chamber 232 communicates with a source of pressure (not shown) by way of a pipe or duct 234 fixed in a suitable opening provided in the platen 225. The platen 225 has at its periphery a channel shaped portion 235 providing therein a chamber 236 closed by the flanged part 199 of the rigid or female die part. The chamber 236 communicates with a source of suction by way of a pipe or duct 237 fixed in a suitable opening provided in the bottom wall 238 of the channel shaped part 235. On or over the outer surfaces of the bags 167ª and 167ᵇ is placed the drain means 173 and upon the drain means 173 reposes the blank or carcass 157. The drain means 173ª is conventionally shown in Fig. 16, and is more specifically shown in various forms in Figs. 6, 7, 8, 9, 10, 11 and 12.

Within the chamber 231 is located a hollow rigid die member 239 having a chamber 240 and a wall 241 having an aperture 242, this member 239 being contoured to conform to the contour of the upper portion of the carcass. Rigid or integral with the wall 241 is a sleeve 243 having telescopic relation with a stem or shaft 244 having a head 245 provided with a flange 246 between which and the wall 241 reacts a helical spring 247 normally tending to press upward and to strain the upper portion of the bag 167ª. The stress of the spring 247 is adjusted or regulated by a screw 248 threaded in the platen 225 and held in adjusted position by a lock nut 249, the upper end of the screw being suitably designed, such as by having a pivot tip 250 in a pivot recess in the head 245.

The draining means 173 extends into the chamber 236 for delivery of the fluids given off by the heat of the die means, and for escape of such fluids by way of the duct 237.

It is preferable to apply different pressures on the bags 167ª and 167ᵇ, as for example, a greater pressure may be effected in the fluid (such as hot oil or the like) in chamber 231 to give the upper portion of the blank 157 a greater thrust, and a lesser pressure in the fluid in chamber 232 to give the lower portion of the blank or carcass 157 a lesser thrust. In some cases it may be desirable that the upper portion of the carcass be compressed and dried slightly in advance of the lower portion of the carcass, whereby the pressure in the chamber 231 will be effected prior to the pressure in the chamber 232. In some instances the pressure in chamber 232 may be the same as in chamber 231 or brought up from a lower pressure to the same pressure as in chamber 231, depending upon the desired or needed results of drying in different portions of the article.

In operation the device acts as described above in connection with Fig. 14, except there may be a differential of pressure applied to the carcass. The member 239 will first press the upper part of the carcass, and then the bags 167ª and 167ᵇ in that order will press the sections adjacent them so that the pressing and drying may be produced progressively with the result of a more rapid and efficacious discharge of the fluids given off by the heat and pressure of the die means, and a better control of the drying over the different portions of the carcass. A finished article of the kind produced by this means is shown in elevation in Fig. 16a.

Figures 17, 18, 19:
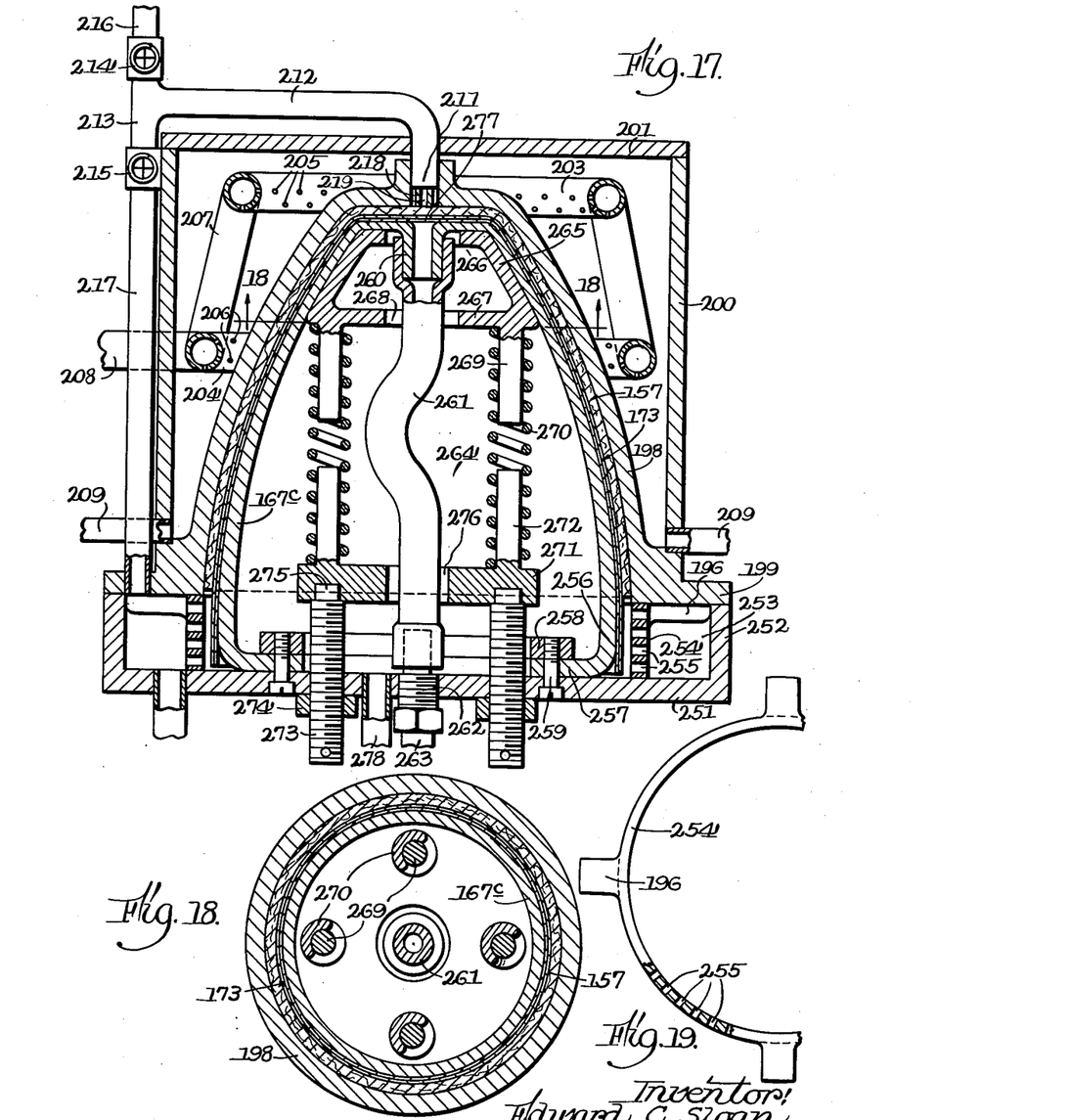

In the form of device shown in Fig. 17, a yieldable die of the type shown in Fig. 14 is used with an additional means for conducting off the fluids given off by the heat of the die means, the conducting means being applied at a high point of the device. The rigid or female die part is identical to those shown in Figs. 14, 15 and 16. The yieldable die part has a platen 251, similar to that shown in Fig. 14, having an upstanding flange 252 with which seats and seals the flange 199 of the female die to close a chamber 253. In the chamber 253 is a lateral supporting ring 254 having apertures 255, for preventing the distortion or distending of the wall portion 256 of the yieldable die member or bag 167ᶜ and the lower part of the draining means 173 when pressure is applied thereon. The bag 167ᶜ has a flange 257 clamped between a ring 258 and the platen 251 by suitable securing elements, such as bolts 259.

At the upper part of the bag 167ᶜ is provided a nipple 260 to which is connected an end of a flexible duct 261, the other end of this duct being connected to a nipple 262 threaded in the platen 251 as shown, the nipple 262 being connected by way of a duct or pipe 263 leading to a suitable source of suction (not shown) if desired.

In the upper part of the chamber 264 provided in the bag 167ᶜ is located a hollow rigid die member 265 having a chamber 266 and a wall 267 provided with an opening 268. The member 265 is contoured to conform with the contour of the upper part of the blank or carcass 173. Rigid or integral with the wall 267 are provided studs 269 extending into helical springs 270 reacting between the wall 267 and a plate 271 also having studs 272 extending into the springs 270. The stress of the springs 270 may be adjusted or regulated by screws 273 threaded in the platen 251 and held in adjusted position by lock nuts 274, the upper ends of the screws having pintle or pivot parts 275 in recesses provided in the plate 271. The plate 271 also has an opening 276 for the extension therethrough of the duct 261.

The draining means 167ᶜ, corresponding to the draining means 167 of Fig. 14, and being of any specific form as shown in Figs. 6, 7, 8, 9, 10, 11 and 12, has a suitable opening 277 registering with the nipple 260. By such a structure fluids driven off by the heat and pressure of the die means are rapidly and readily conducted away, especially at the upper portion of the die. The duct 261 is so reinforced as not to collapse under pressure of the fluid in the chamber 264 in the bag 167c but may easily bend or flex under the expanding and contracting action of the bag 167c.

To the platen 251 is connected a duct or pipe 278 for supplying fluid (such as hot oil) under pressure to the chamber 264. In other respects the structure is similar to that shown in Fig. 14 and is correspondingly identified by like reference characters. The operation of this device is similar to that described in connection with Fig. 5.

While I have herein described and upon the drawings shown various embodiments of the invention, it is to be understood that the invention is not limited thereto but comprehends other constructions, arrangements of parts, details, forms, features, process steps, or the like, without departing from the spirit of the invention.

Having thus disclosed the invention, I claim:

1. A device for drying an article composed of fibrous material initially accreted, interlaced and integrated into the final given form from suspended fibres in a liquid suspending medium and having a predetermined contour, comprising a rigid die member having a contoured face portion conforming to a contoured face portion of the article, a yieldable die member on the opposite side of said contoured face portion of said article and having a self-maintained contoured face portion conforming to the contoured face portion on said opposite side of said article, a drain means for said yieldable die member and comprising a hollow member composed of flexible and yieldable material and providing therein a chamber for a pressure fluid and having a contoured surface portion conforming to said opposite contoured surface portion of said article, an aggregate of relatively movable rigid elements so arranged and constructed as to repose on said contoured surface portion of said hollow member and to flex and yield to conform to said opposite contoured surface portion of said article and to compress the latter, said elements having spaces among them for the escape of fluids driven off by heat, a movable rigid member in said hollow member for pressing against a given portion of said hollow member to strain the same and for pressing a portion of said aggregate of rigid elements against a portion of said opposite contoured surface portion of said article, means for heating said device for supplying heat to said article for driving off said fluids, and a pressure fluid in said hollow member.

2. A device for drying a fibrous article, comprising a rigid die member having a contoured face portion conforming to a contoured face portion of the article, a yieldable die member on the opposite side of said contoured face portion of said article and having a self-maintained contoured face portion conforming to the contoured face portion on said opposite side of said article, said yieldable die member comprising a hollow member composed of flexible and yieldable material and providing therein a chamber for a pressure fluid and having a contoured surface portion conforming to said opposite contoured surface portion of said article, an aggregate of relatively movable rigid elements so arranged and constructed as to repose on said contoured surface portion of said hollow member and to flex and yield to conform to said opposite contoured surface portion of said article and to compress the latter, said elements having spaces among them for the escape of fluids driven off by heat, a movable rigid member in said hollow member for pressing against a given portion of said hollow member to strain the same and for pressing a portion of said aggregate of rigid elements against a portion of said opposite contoured surface portion of said article, resilient means for normally pressing said rigid member in said hollow member against said given portion of said hollow member, means for heating said device for supplying heat to said article for driving off said fluids, and a pressure fluid in said hollow member.

3. A device for drying an article composed of fibrous material initially accreted, interlaced and integrated into the final given form from suspended fibres in a liquid suspending medium and having a predetermined contour, comprising a rigid die member having a contoured face portion conforming to a contoured face portion of the article, a yieldable die member on the opposite side of said contoured face portion of said article and having a contoured face portion conforming to the contoured face portion on said opposite side of said article, said yieldable die member comprising a hollow member composed of flexible and yieldable material and providing therein a chamber for a pressure fluid and having a contoured surface portion conforming to said opposite contoured surface portion of said article, an aggregate of relatively movable rigid elements so arranged and constructed as to repose on said contoured surface portion of said hollow member and to flex and yield to conform to said opposite contoured surface portion of said article and to compress the latter, said elements having spaces among them for the escape of fluids driven off by heat, said hollow member varying in thickness from one portion to another portion thereof, a movable rigid member in said hollow member for pressing against a thinner portion of said hollow member to strain the same and for pressing a corresponding portion of said aggregate of rigid elements against a corresponding portion of said opposite contoured surface portion of said article, means for heating said device for supplying heat to said article for driving off said fluids, and a pressure fluid in said hollow member.

4. A device for drying an article composed of fibrous material initially accreted, interlaced and integrated into the final given form from suspended fibres in a liquid suspending medium and having a predetermined contour, comprising a rigid die member having a contoured face portion conforming to a contoured face portion of the article, a yieldable die member on the opposite side of said contoured face portion of said article and having a contoured face portion conforming to the contoured face portion on said opposite side of said article, said yieldable die member comprising hollow members composed of flexible and yieldable material and providing therein chambers for containing pressure fluids, said hollow members having contoured surface portions conforming to contoured surface portions of said opposite contoured surface portion of said article, an aggregate of relatively movable rigid elements between said contoured surface portions of said hollow members and the corresponding contoured surface portions of said opposite contoured surface portion of said article and being so constructed and arranged as to flex and yield in conformity to said corresponding contoured surface portions of said article and to compress the latter, another aggregate of relatively movable rigid elements between the opposing surface portions of said hollow members and being so constructed and arranged as to flex and yield in conformity to said corresponding opposing surface portions of said hollow members, said rigid elements of said aggregates having spaces among them for escape of fluids driven off by heat, said aggregate between said hollow members providing for an additional way of escape for the fluids to the way of escape for the fluids in the aggregate between said article and said hollow members, means for heating said device for supplying heat to said article for driving off said fluids, and pressure fluids in said chambers of said hollow members.

EDWARD C. SLOAN.